United States Patent [19]

Braccio et al.

[11] Patent Number: 4,948,369
[45] Date of Patent: Aug. 14, 1990

[54] CONNECTOR ASSEMBLY

[75] Inventors: Matthew A. Braccio; David W. Gross, both of Cherry Hill, N.J.

[73] Assignee: General Electric Company, East Windsor, N.J.

[21] Appl. No.: 51,431

[22] Filed: May 19, 1987

[51] Int. Cl.$^5$ ............................................. H01R 13/639
[52] U.S. Cl. ..................................... 439/347; 439/362
[58] Field of Search ............... 439/310, 345, 347, 359, 439/361–365

[56] References Cited

U.S. PATENT DOCUMENTS

| 2,845,604 | 7/1958 | Jackson et al. | 439/363 |
| 2,933,713 | 4/1960 | Jackson et al. | 439/363 |

Primary Examiner—Joseph H. McGlynn
Attorney, Agent, or Firm—Clement A. Berard, Jr.

[57] ABSTRACT

A connector for an Orbital Replacement Unit (ORU) includes a screw in an active connector structure which mates with a floating nut in a passive connector structure. Two alignment pins in active structure mate with sockets in the passive structure. As the screw is turned, a push rod assembly in the active structure couples to a one-axis restraint in the passive structure. One alignment pin has a two-axis restraint and the other has a three-axis restraint. The screw is driven manually or by a robot to cooperate with the alignment pins and sockets to provide a three point mount.

11 Claims, 3 Drawing Sheets

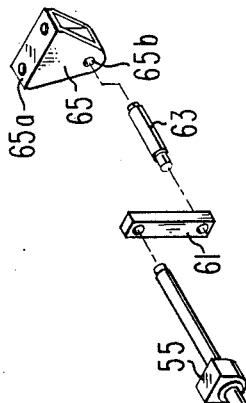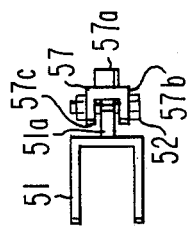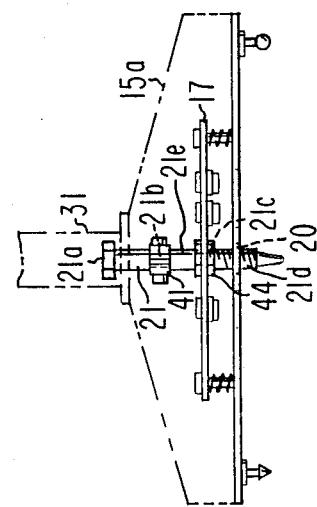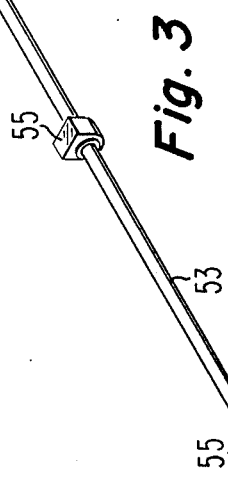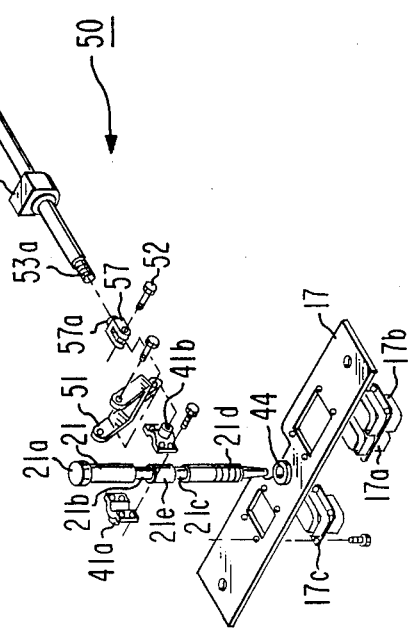

CONNECTOR ASSEMBLY

BACKGROUND OF THE INVENTION

This invention relates to a connector for mating and demating modular units to a platform structure.

The potential for servicing satellites in orbit in order to lengthen their useful lives and to upgrade or change their functions has been demonstrated with the exchange of a section of the Solar Max spacecraft by astronauts in the space shuttle orbiter bay. In the future, equipment that provides for major spacecraft functions can be housed in modules, commonly known as orbital replacement units (ORU's), that can be attached and detached, as needed. Such equipment includes sensors, tape recorders, computers, transponders and batteries, among others.

The flexibility and cost-effectiveness of the module exchange process are improved by making it entirely autonomous using such mechanisms as the remote manipulator system (RMS) presently used on the space shuttle orbiter, and the Intergrated Orbital Servicing System being developed (for the NASA Marshall Space Flight Center) as part of the concept design of an orbital maneuvering vehicle (OMV). The trend toward dependence on robotic rather than astronaut activity places exacting demands on the mechanisms that interconnect the modules to the structures that carry them. For instance, the attachment mechanism must cooperate with a robot arm to insure alignment, provide a stable mount for delicate instruments, and act as a path for the flow of electricity, data and fluids, while maintaining simplicity of operation. This interface needs to be a standard part of the ORU, meeting the different requirements of a variety of instruments and equipment.

SUMMARY OF THE INVENTION

In accordance with one embodiment of the present invention a connector is provided for mounting one unit to a receiving unit wherein the connector includes an active connector structure and a mating passive connector structure. The active connector structure includes a connector bracket with at least one coupler half extending from the connector bracket, and a screw extending through and against the said connector bracket. A threaded portion and tapered tip of the screw extends through and protrudes from said connector bracket The active connector structure includes alignment pins extending parallel to and on either side of said screw. The passive connector structure includes a floating nut adapted to receive said screw, a mating coupler half adapted to couple to the one coupler half and tapered sockets adapted to receive said alignment pins. The screw and alignment pins guide the mating of the coupler halves and, when the screw is turned, the coupler halves are driven together.

DESCRIPTION OF THE DRAWING

FIG. 3 is a functional sketch of the screw and push rod assembly of FIG. 1;

FIG. 4 is a sketch illustrating the mounting of the screw assembly in the spreader beam housing of FIG. 1;

FIG. 5 is a sketch of the yoke and link of the push rod assembly of FIG. 3;

Referring to FIG. 1 there is illustrated an exploded perspective view the orbital replacement unit (ORU) 10 and a section of the mating platform 13. The ORU 10 is mounted to a baseplate 11. Fixed to one end 11a of the baseplate 11 and ORU 10 is a load spreader beam housing 15. The load spreader beam housing has a rectangular lower housing plate 15b that fits over an inverted trough upper half 15a. The depth of the trough is maximum at the center and tapers to the ends. The top center portion 15c of upper half 15a is flat and has an aperture 15d therethrough. The load spreader beam housing 15 encloses a connector bracket 17 which is rectangular.

Figure 1:
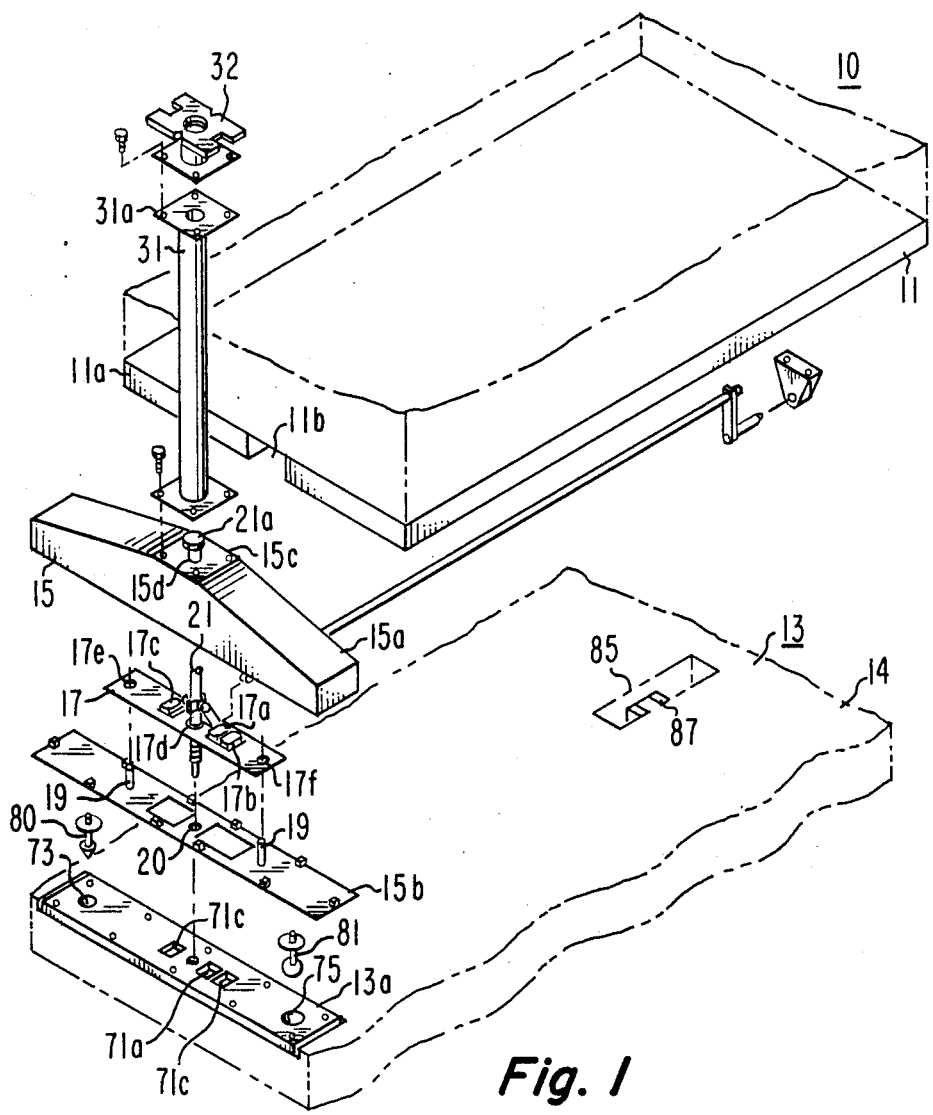
FIG. 1 is an exploded view of an ORU with active connector structure and the passive connector structure with the platform in accordance with a preferred embodiment of the present invention.

The connector bracket 17 has mounted thereto male electrical connectors 17a, 17b and 17c. The bracket 17 has a central aperture 17d. Near either end of bracket 17 are alignment apertures 17e and 17f. Alignment pins 19 are fixed to and extend from points located near opposite end of the lower housing plate 15b. The alignment pins 19 extend through the apertures 17e and 17f of bracket 17. Coil springs 22 (not shown in FIG. 1) as shown in the sketch of FIG. 2 are positioned over the pins 19 between the connector bracket 17 and lower housing plate 15b. The pins 19 have a head 19a over connector bracket 17 to mount the bracket 17 to the housing. The connector bracket 17 central aperture 17d is aligned with the central aperture 15d of upper half 15a and an aperture 20 in plate 15b so a screw 21 of screw assembly passes therethrough.

The screw assembly includes the screw 21 that has a hexagonal head end 21a that extends above the upper load spreader beam housing 15 into a handle extension tube 31. The upper or head end of the screw 21 is shown broken away in FIG. 1. The isolated screw is shown in FIG. 3. The screw 21 when assembled in the housing 15 has the head portion 21a extending above upper housing half 15a. See FIG. 4. The screw has a first reduced diameter portion 21b which receives the sleeve halves 41a and 41b. The screw 21 has a second reduced diameter portion 21c which fits inside a sleeve bearing 44 inside aperture 17d of connector bracket 17. A collar 21e is formed between portions 21b and 21c. The lower portion 21d of screw 21 includes ACME threads and tapered pin tips which extend through aperture 20 and below lower plate 15b. The screw 21 is free to rotate within sleeve halves 41a and 41b and within sleeve bushing 44. A push rod assembly 50 is coupled to sleeve halves 41a and 41b.

The push rod assembly 50 as illustrated in FIG. 3 includes a yoke 51, a link 57, a shear pin 63, a right angle bracket 61, a push rod 53 mounted by rod bearing mounts 55 to the underside of base plate 11, and a shear pin bracket 65 also mounted to the underside of base plate 11. The underside of base plate 11 has a trough 11b (FIG. 1) centered along the length thereof to accommodate the push rod 53. The push rod is coupled via link 57 to yoke 51. The yoke 51 is U-shaped with a central flange 51a as shown in FIG. 5 which mates between the legs 57b and 57c of small U-shaped link 57 which has a circular socket at the opposite end 57a that is adapted to receive reduced diameter end 53a of rod 53. A pin 52 passes through apertures in the legs 57b and 57c of the link 57 and flange end 51a of yoke 51. The sleeve halves 41a and 41b are mounted together using bolts and recessed nuts about screw 21 over reduced diameter portion 21b and above collar 21e. The legs 51b and 51c of the yoke 51 are pivotally mounted by bolts to recessed nuts in sleeve halves 41a and 41b. The opposite end of rod 53 is fixed to one end of the right angle bracket 61 which functions to bring a remote locking mechanism below the base plate 11. The shear pin 63 is fixed to the opposite end of bracket 61 and extends parallel to rod 53 but extends below base plate 11. The shear pin bracket 65 is fixed at one end 65a to the underside of the base plate and extends away from the base plate to receive the shear pin 63 which passes freely but guidedly through an aperture 65b in bracket 65. The shear pin extends out away from the bracket to engage a socket 87 in the mating platform 13.

Figure 2:
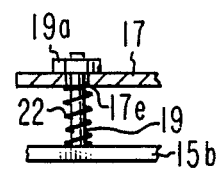
FIG. 2 is a sketch illustrating the connector bracket return mechanism of FIG. 1.

A 2-axis restraint pin 80 and a 3-axis restraint pin 81 extend from opposite ends of lower housing plate 15b as shown in FIG. 1. The 2-axis restraint pin 80 has a V-shaped pin tip and the 3-axis restraint pin 81 has a round ball shaped tip.

Figure 6:
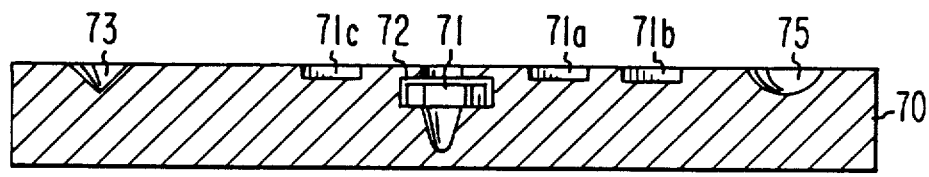
FIG. 6 is a sketch of the passive connector structure in the platform of FIG. 1.

In the mating platform 13 shown in FIGS. 1 and 6 there is located at one end 13a a mating plate 70 including a floating nut 71 which is adapted to receive the ACME threaded screw 21, tapered sockets 73 and 75 which are adapted to receive the alignment pins 80 and 81 and the mating connector halves 71a, 71b and 71c. The floating nut 71 is located between mating connector half 71b and 71c. The nut 71 is captured in a central recess 72 in plate 70. The nut 71 has threads to match the ACME threads of screw 21. The tapered socket 73 is a V-groove for receiving V-shaped pin 80 and socket 75 is a bowl-shaped groove to match the ball shaped tip of pin 81.

Figure 7:
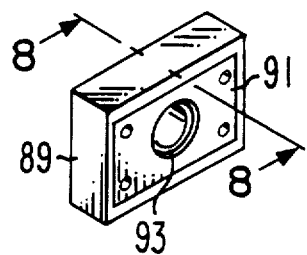
FIG. 7 is a spectrum view of the restraint socket of FIG. 1.
Figure 8:
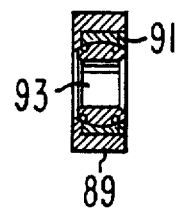
FIG. 8 is a cross section of the restraint socket as viewed across 8—8 of FIG. 7.

Recess 85 in the platform mating surface 14 is located remotely (approximately the length of the ORU or push rod) from the recess for the floating nut 71. See FIG. 1. The recess 85 is sufficient to receive one end of the bracket 61, shear pin 63 and shear pin bracket 65 and to allow the shear pin and bracket 61 to slide along the recess into a one axis restraint socket 87 recessed therein and fixed to the platform 13. Referring to FIGS. 7 and 8, the socket 87 includes a housing 89 fixed to the platform, a bearing retainer plate 91 fixed to the housing and a circular ball bushing 93 which is retained but floating within the plate 91.

The ORU 10 can be of varying heights and is located on base plate 11. An extension tube 31 as shown in FIG. 1 extends along the side of the ORU 10 and from central portion 15c of upper half 15a of the load spreader beam. The lower end of tube 31 surrounds the head 21a of screw 21. The head of the screw is adjacent the top of the load spreader beam 15. The opposite free end of tube 31 has a flange 31a to which is fixed a Robot handle 32 for example.

In the operation of the system described above, a robot, for example, grasps the handle 32 which is fixed to the tube 31 fixed to the ORU 10 and moves the ORU 10 with base plate 11 onto the platform 13. The 2-axis pin 80 and 3-axis pin 81, the tapered end of screw 21 and the recess 85 align the ORU and baseplate to the platform 13. Once this alignment is done, a teleservicer wrench (a long socket wrench) is extended from the robot arm through tube 31 and onto the head 21a of screw 21. As the screw 21 is turned against the top of load spreader beam 15, the ACME threads engage the floating nut 71. Further, as the screw 21 is turned, the screw 21 rotates about recessed portion 21b and pulls the screw 21 downward or into floating nut 71. As this occurs, the sleeve halves 41a and 41b and the bracket 17 are pulled down which cause push rod 53 via yoke 51 and link 53 to extend and cause the connectors 17a, 17b and 17c to be mated with the matching connector halves 71a, 71b and 71c. The extension of rod 53 causes the shear pin 63 to extend into the circular ball bushing 93 of the socket 87. Further, as the screw 21 is driven down the screw against the load spreader beam 15 transfers a load to the pins 80 and 81 and sockets 73 and 75.

Although electrical connector halves 17a, 17b and 17c and their mating connector halves 71a, 71b and 71c are shown in FIGS. 1 through 6, these electrical connector halves could be other types of couplers such as fluid couplers or RF connectors so as to enable fluids and microwave signals as well as electrical power to flow between units and the platform.

Figure 9:
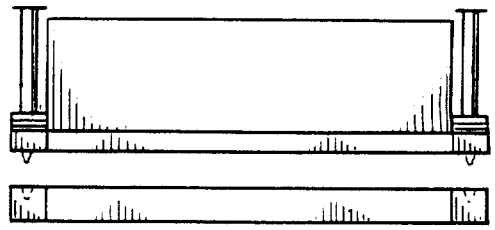
FIG. 9 is an end view of a second embodiment of the present invention.
Figure 10:
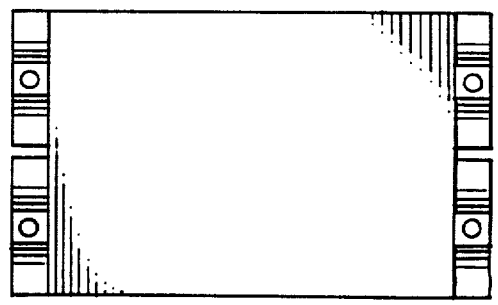
FIG. 10 is a top view of a third embodiment of the present invention.

The preferred embodiment shows the push-rod and screw assembly to effect the coupling with the operation of turning only one screw. In a second embodiment, a second screw assembly, load spreader beam, and connector bracket may be at opposite end of the ORU as shown in FIG. 9 in place of the push-rod assembly. The coupling and mating would be a two step process. Also the screw assembly could be at all four corners as shown in FIG. 10.

What is claimed is:

1. An interface connector for connecting one unit to a second unit comprising:
   an active connector structure coupled to said one unit including:
   a connector bracket with at least one mating coupler half extending from said connector bracket,
   a screw having a reduced diameter portion, a threaded portion and a tapered tip portion with the reduced diameter portion passing through the center of said connector bracket to allow free rotation of the screw and coupling of the screw to the connector bracket with the threaded and tapered tip portions protruding from said connector bracket, and
   a push rod assembly, coupled to said screw and extending to a point of said one unit remote from said screw, for engaging a remote socket in said second unit, and
   first and second alignment devices aligned parallel to each other and to said screw; and
   a passive connector structure on the second unit including:
   a floating nut adapted to receive and engage the threads of said screw,
   a mating coupler half adapted to mate with said one coupler half,
   a remote socket located at a point remote from said floating nut for being engaged by said push rod assembly, and
   third and fourth alignment devices adapted to receive and contact said first and second alignment devices, whereby when said one unit is adjacent said second unit and said alignment devices provide alignment, said screw tapered tip is placed through the floating nut for engagement of the threads of the screw with the threads of said nut, and the screw is turned the connector bracket with said one coupler half is driven so as to mate with the mating coupler half and said push rod assembly engages said remote socket.

2. An interface connector for connecting one unit to a second unit comprising:

an active connector structure coupled to the one unit including at one end a connector bracket and having at least one mating coupler half extending from said connector bracket, a load spreader beam, said spreader beam including protruding alignment pins near opposite ends of said beam, a screw extending through the center of said load spreader beam and said connector bracket, said screw having a tapered tip and a threaded portion protruding from said connector bracket and said spreader beam, said screw having a broader head end that extends above said spreader beam and is too large to pass therethrough; and a passive connector structure on the second unit including a floating nut adapted to receive the tapered tip and engage the threads of said screw, a mating coupler half adapted to mate with said one coupler half, a remote socket remote from said floating nut, and tapered sockets adapted to receive said alignment pins, said active connector structure further including a push rod assembly coupled to said screw and extending to a point near an end of said active connector structure remote from said screw for engaging said remote socket in said passive connector structure, said push rod assembly being coupled to said screw to be responsive to said screw being driven towards said floating nut for extending part of said push rod assembly into said remote socket;

whereby when said one unit is placed on said second unit and said pins are guided into said sockets providing alignment and the tapered tip of said screw placed through the floating nut for engagement of the threads of the screw with the threads of said nut, and when the screw is turned, the connector bracket with said one coupler half is driven so as to mate with the mating coupler half, and when the screw is further turned the broader head end of said screw engages the load spreader beam which translates a load to the pins and the pin sockets to provide a rigid connected structure.

3. The combination of claim 2 wherein a bottom surface of said one unit includes a trough to receive said push rod assembly.

4. The combination of claim 3 wherein said push rod assembly includes a shear pin at one end thereof and said second unit includes said remote socket located in a recess adapted to receive said shear pin extending from said push rod assembly, said recess adapted to permit lengthwise movement of the shear pin into and out of said remote socket.

5. The combination of claim 4 wherein said remote socket includes a ring with a ball bushing.

6. The combination of claim 1 wherein said mating coupler half includes an electrical connector.

7. The combination of claim 2 wherein one of said alignment pins has a ball tip and an associated one of said tapered sockets is bowl-shaped.

8. The combination of claim 2 where one of said pins is V-shaped and an associated one of the tapered sockets is a V-shaped groove.

9. The combination of claim 2 wherein one of said pins and an associated socket provides a 3-axis restraint and the other of said pins and an associated socket provides a 2-axis restraint.

10. An interface connector for connecting a unit to a platform comprising:

an active connector structure coupled to the unit including at one end a connector bracket with at least one mating coupler half extending from said connector bracket, a load spreader beam, said spreader beam including protruding alignment pins near opposite ends of said beam, a screw having a reduced diameter portion, a threaded portion and a tapered tip portion, said screw extending through the center of said load spreader beam and said connector bracket at the reduced diameter portion of the screw with the threaded and tapered tip portions of the screw protruding from said connector bracket and said spreader beam, said screw passing through said connector bracket at said reduced diameter portion to allow rotation of the screw and coupling of the screw to the connector bracket, said screw having a broader head end extending above said spreader beam and being too large to pass therethrough; and a passive connector structure on the platform including a floating nut adapted to receive the tapered tip portion and engage the thread portion of said screw, a mating coupler half adapted to mate with said one coupler half, a remote socket located remote from said floating nut, and tapered sockets having a bottom and adapted to receive said alignment pins, said pins, sockets and screw being located so that when said one unit is placed on said platform said tapered tip portion of said screw is placed through the floating nut and said pins are guided into said sockets providing alignment and engagement of the threads of the screw with the threads of said nut, and when the screw is turned the connector bracket with said one coupler half is driven so as to mate with the mating coupler half, and when the screw is further turned and the broader head end of said screw engages the load spreader beam and drives said pins against the bottoms of said sockets, said active connector structure further including a push rod assembly coupled to said screw and extending to a point near an end of said unit remote from said screw for engaging said remote socket in said platform, said push rod assembly being coupled to said screw to be responsive to said screw being driven into said floating nut for extending said push rod into said remote socket;

whereby the spreader beam translates a load to said pins and the pin sockets to provide a rigid connected structure.

11. The combination of claim 10 wherein said push rod assembly is coupled to said screw at a second reduced diameter portion of said screw.

* * * * *

UNITED STATES PATENT AND TRADEMARK OFFICE
CERTIFICATE OF CORRECTION

PATENT NO. : 4,948,369

DATED : August 14, 1990

INVENTOR(S) : Matthew A. Braccio et al.

It is certified that error appears in the above-identified patent and that said Letters Patent is hereby corrected as shown below:

Drawing "Sheet 1 of 2" should be --Sheet 1 of 3--.

Drawing "Sheet 2 of 2" should be --Sheet 2 of 3--.

Drawing Sheet 3 of 3 (attached) should have been printed with the patent.

Column 5, line 4, after "and" insert --when--.

Signed and Sealed this

Seventh Day of January, 1992

Attest:

HARRY F. MANBECK, JR.

*Attesting Officer*     *Commissioner of Patents and Trademarks*